United States Patent
Yakata et al.

(10) Patent No.: US 7,083,225 B2
(45) Date of Patent: Aug. 1, 2006

(54) VEHICLE BODY STRUCTURE OF PERIPHERY OF REAR SUSPENSION

(75) Inventors: Takashi Yakata, Toyoake (JP); Hideki Honjo, Okazaki (JP); Shinsuke Miyoshi, Okazaki (JP); Takashi Kikuchi, Kasugai (JP); Keishi Goto, Okazaki (JP)

(73) Assignees: Mitsubishi Jidosha Kogyo Kabushiki Kaisha (JP); Mitsubishi Jidosha Engineering Kabushiki Kaisha (JP)

( * ) Notice: Subject to any disclaimer, the term of this patent is extended or adjusted under 35 U.S.C. 154(b) by 2 days.

(21) Appl. No.: 10/803,537

(22) Filed: Mar. 18, 2004

(65) Prior Publication Data

US 2004/0245807 A1  Dec. 9, 2004

(30) Foreign Application Priority Data

| Mar. 20, 2003 | (JP) | 2003-078487 |
| Mar. 20, 2003 | (JP) | 2003-078488 |
| Aug. 27, 2003 | (JP) | 2003-303311 |

(51) Int. Cl.
*B62D 25/08* (2006.01)

(52) U.S. Cl. ............... 296/203.04; 296/193.08; 296/29; 296/198; 296/187.11

(58) Field of Classification Search ........... 296/203.01, 296/203.04, 193.08, 29, 30, 198, 187.11
See application file for complete search history.

(56) References Cited

U.S. PATENT DOCUMENTS

| 3,517,765 A | * | 6/1970 | Eggert, Jr. et al. ......... 180/312 |
| 5,350,143 A | * | 9/1994 | Hoshino ..................... 248/166 |
| 5,580,121 A | * | 12/1996 | Dange et al. ............. 296/181.4 |
| 5,671,947 A | * | 9/1997 | Henn ......................... 280/756 |
| 5,788,322 A | * | 8/1998 | Wolf et al. ............... 296/181.4 |
| 6,010,181 A | * | 1/2000 | Robbins et al. ........ 296/203.04 |
| 6,088,918 A | * | 7/2000 | Corporon et al. .......... 29/897.2 |
| 6,196,622 B1 | * | 3/2001 | Brodt et al. ........... 296/203.04 |
| 6,206,459 B1 | * | 3/2001 | Kim ......................... 296/198 |
| 6,241,309 B1 | * | 6/2001 | Roehl et al. ........... 296/203.04 |
| 6,802,558 B1 | * | 10/2004 | Matsuoka ............... 296/230.04 |
| 6,808,228 B1 | * | 10/2004 | Campbell et al. ...... 296/193.02 |
| 6,874,844 B1 | * | 4/2005 | Vincenti ................ 296/203.04 |

FOREIGN PATENT DOCUMENTS

| JP | 58063577 A | * | 4/1983 |
| JP | 02189287 A | * | 7/1990 |
| JP | 04039175 A | * | 2/1992 |
| JP | 6-19427 | | 5/1994 |
| JP | 6-19427 Y2 | | 5/1994 |
| JP | 6-21827 | | 6/1994 |
| JP | 6-21827 Y2 | | 6/1994 |
| JP | 6-219329 A | | 8/1994 |
| JP | 11-348826 A | | 12/1999 |

* cited by examiner

Primary Examiner—D. Glenn Dayoan
Assistant Examiner—Greg Blankenship
(74) Attorney, Agent, or Firm—Rossi, Kimms & McDowell, LLP.

(57) ABSTRACT

Coupling members include a first coupling portion (X) that couples rear quarter inner members to upper surfaces of rear suspension base members, a second coupling portion (Y) that couples upper surfaces of the rear suspension base members together, which are located on the right and the left in pairs, and a third coupling portion (Z) that joins the second coupling portion to couple the rear quarter inner members together, which are located on the right and the left in pairs, the coupling member being integrally formed, and there is formed a bulkhead structure in a portion surrounded by the first, second and third coupling portions.

9 Claims, 10 Drawing Sheets

VEHICLE BODY STRUCTURE OF PERIPHERY OF REAR SUSPENSION

This Nonprovisional application claims priority under 35 U.S.C. §119(a) on Patent Application Nos. 2003-078487 and 2003-078488 filed on Mar. 20, 2003, and Patent Application No. 2003-303311 filed on Aug. 27, 2003, the entire contents of which are hereby incorporated by reference.

BACKGROUND OF THE INVENTION

1. Field of the Invention

The present invention relates to a vehicle body structure of a periphery of a rear suspension.

2. Description of the Related Art

In a vehicle body formed in a monocoque structure, rigidity and strength of the vehicle body in a periphery of a rear suspension that is applied with a large input load, are increased by devising a structure of various components.

Structures that have been developed includes a structure in which a reinforcement is provided to the back of a seat back side panel to receive a load that is applied to a rear suspension base member evenly by means of the seat back side panel and the reinforcement (refer to Unexamined Japanese Patent Publication No. 6-219329) and a structure that is reinforced by joining the upper surface of a rear suspension base member to a rear quarter inner member by means of a reinforcement to receive an input load from the rear suspension by the rear quarter inner member side (refer to Unexamined Japanese Patent Publication No. 11-348826).

There are other structures which include the one in which the upper surfaces of right and left rear suspension base members that receive an input load from the rear suspension are coupled together with a closed cross sectional structure (refer to Examined Japanese Utility Model Publication No. 6-21827) and the one in which couplement is carried out between rear quarter inner members, between wheelhouse inner members, and between the wheelhouse inner members and the rear quarter inner members, with a closed cross sectional structure (refer to Examined Japanese Utility Model Publication No. 6-19427).

The structure disclosed in Publication No. 6-19427 is so designed as to couple the wheelhouse inner members together, and to couple the wheelhouse inner members to the rear quarter inner members, with the closed cross sectional structure.

SUMMARY OF THE INVENTION

The present invention consists in providing a vehicle body structure of a periphery of a rear suspension, that is capable of assuring sufficient rigidity and strength while efficiently dispersing an input load from the rear suspension.

The vehicle body structure of the periphery of the rear suspension according to the invention includes a rear suspension base member, which receives an input load from the rear suspension, in a wheelhouse inner member and is formed by joining the wheelhouse inner member to a rear quarter inner member. The vehicle body structure comprises a coupling member that couples an upper surface of the rear suspension base member to the rear quarter inner member for reinforcement, the vehicle body structure in which the coupling member is made up of plate members and forms a closed cross sectional structure over the whole gamut thereof in consort with the wheelhouse inner member and the rear quarter inner member.

The vehicle body structure according to the invention includes rear suspension base members, which receive the input load from the rear suspension, in the respective wheelhouse inner members and is formed by joining the wheelhouse inner members to the respective rear quarter inner members. The vehicle body structure comprises the coupling member extending in a width direction of the vehicle, coupling upper surfaces of the right and left rear suspension base members together and coupling the right and left rear quarter inner members together, the vehicle body structure in which the coupling member is made up of plate members and form a closed cross sectional structure over the whole gamut thereof.

Furthermore, the vehicle body structure according to the invention includes the rear suspension base members, which receive an input load from the rear suspension, in the respective wheelhouse inner members and is formed by joining the wheelhouse inner members to the respective rear quarter inner members. The vehicle body structure comprises the coupling member including a first coupling portion that couples the upper surfaces of the rear suspension base members to the respective rear quarter inner members, a second coupling portion that couples the upper surfaces of the right and left rear suspension base members together, and a third coupling portion that joins the second coupling portion to couple the right and left rear quarter inner members together, the coupling member being formed as one, the vehicle body structure in which the coupling member is made up of plate members, forms a closed cross sectional structure over the whole gamut thereof, and has a bulkhead structure in a portion surrounded by the first, second and third coupling portions.

BRIEF DESCRIPTION OF THE DRAWINGS

The present invention will become more fully understood from the detailed description given herein below and the accompanying drawings which are given by way of illustration only, and thus, are not limitative of the present invention, and wherein.

DETAILED DESCRIPTION OF THE PREFERRED EMBODIMENTS

Embodiments of a vehicle body structure of a periphery of a rear suspension according to the present invention will be described below with reference to the attached drawings.

Firstly, a first embodiment will be explained.

Figure 1:
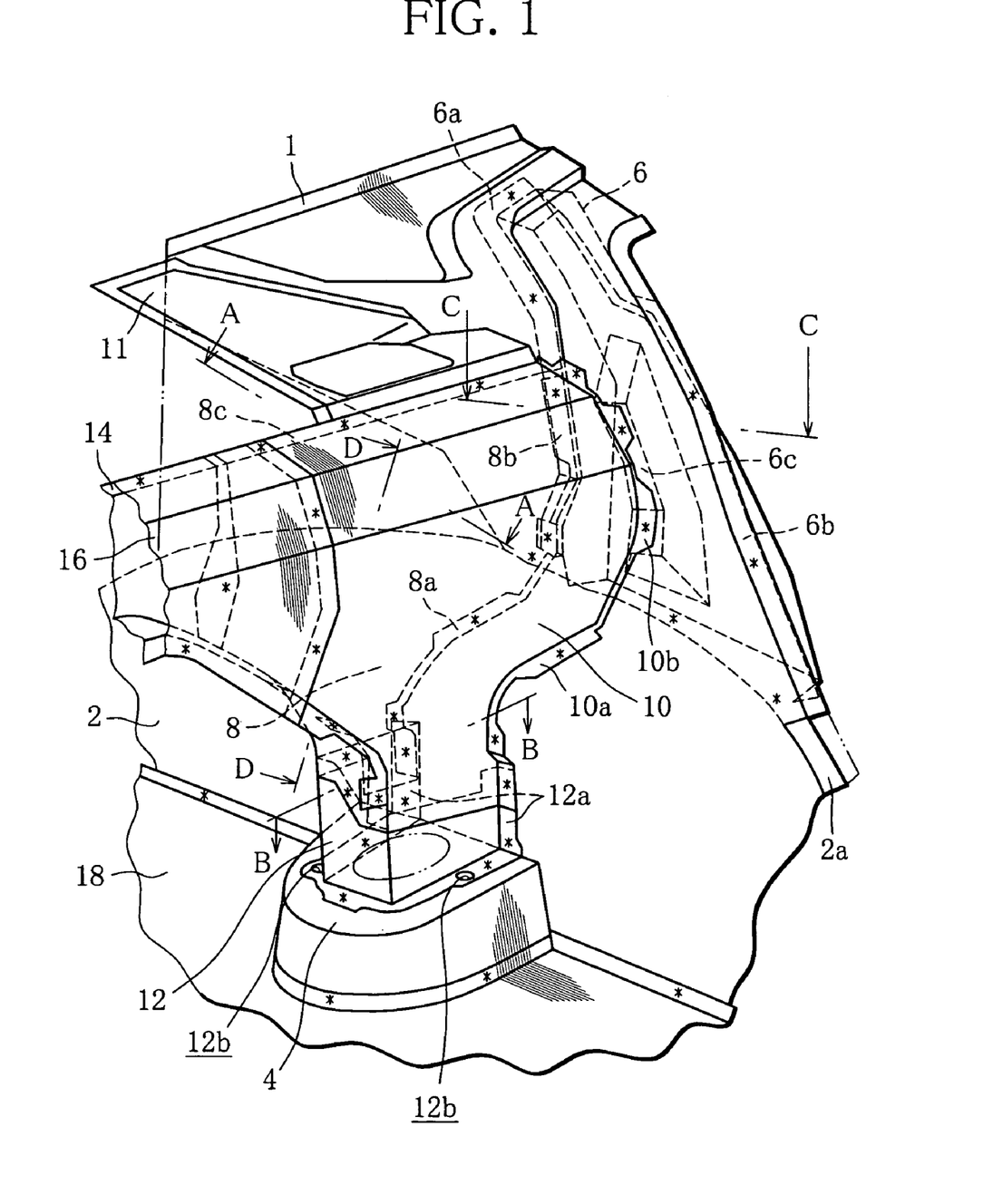
FIG. 1 is a perspective view showing a vehicle body structure of a periphery of a rear suspension according to a first embodiment of the present invention.
Figure 2:
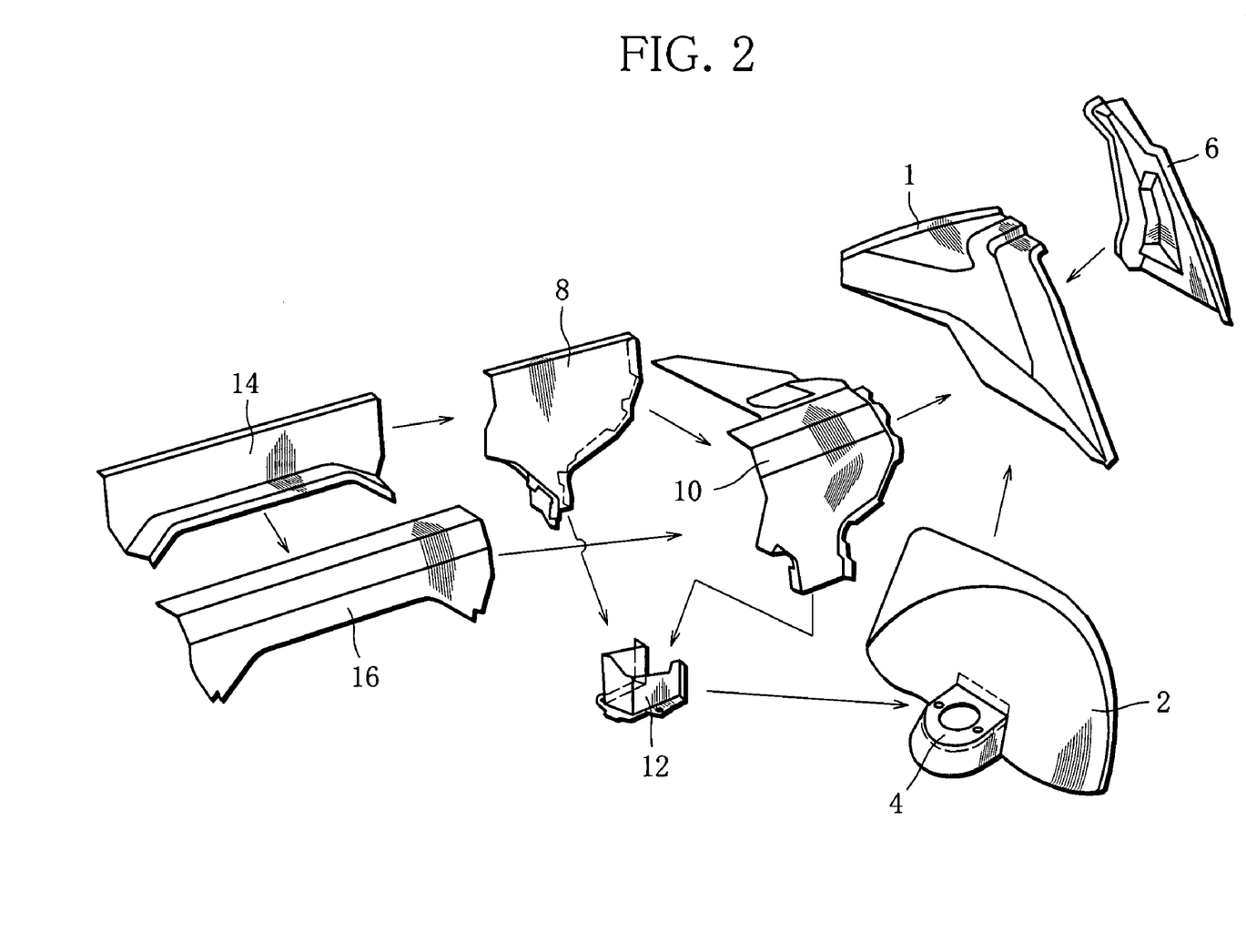
FIG. 2 is a view showing components of the vehicle body structure of the periphery of the rear suspension according to the first embodiment of the present invention.

FIG. 1 is a perspective view of a vehicle body structure of a periphery of a rear suspension according to the present invention in a vehicle body formed in a monocoque structure, viewed from the passenger compartment. FIG. 2 shows components of the vehicle body structure of the periphery of the rear suspension according to the invention. Although only a left portion of the vehicle will be described herein, a right portion has an identical structure. Descriptions of outer plate members, such as a rear fender, will be omitted.

As illustrated in FIG. 2, in the periphery of the rear suspension, the vehicle body is composed of steel plate members, namely a rear pillar inner (rear quarter inner member) 1, a wheelhouse inner (wheelhouse inner member) 2, a rear pillar reinforcement (reinforcing member) 6, a rear deck member extension 8, a seat back inner (seat back inner member) 10, a strut support bracket 12, a rear deck member 14, and a rear shelf extension (rear shelf member) 16.

Amongst these steel plate members, the rear deck member extension 8, the seat back inner 10, the strut support bracket 12, the rear deck member 14, and the rear shelf extension 16 compose the coupling member.

These components are assembled as shown by arrows of FIG. 2 and spot-welded to one another (shown by * marks in FIG. 1). Employed as a rear suspension herein is a rear strut. As illustrated in FIG. 2, a strut base (rear suspension base member) 4 formed of a thick steel plate is welded to the wheelhouse inner 2. The seat back inner 10 is integrally provided with a rear shelf side 11.

As illustrated in FIG. 1, the strut support bracket 12, in which one of four sides of a cross section thereof is open, is welded onto the top of the strut base 4, being open toward the wheelhouse inner 2 side. The strut support bracket 12 has weld flanges 12a, 12a located in a pair of edge portions thereof, the weld flanges 12a, 12a being welded to the wheelhouse inner 2. Thus, a closed cross sectional structure is formed by the strut support bracket 12 and the wheelhouse inner 2 on the strut base 4. Additionally, the rear strut is fixed also to the strut support bracket 12 at apertures 12b.

The rear deck member extension 8 is welded to the wheelhouse inner 2 at a weld flange 8a in the rear side of the vehicle so as to extend in a width direction of the vehicle. The seat back inner 10 is also welded to the wheelhouse inner 2 at a weld flange 10a in the front side of the vehicle in parallel with the rear deck member extension 8 so as to extend in the width direction of the vehicle.

The rear deck member extension 8 includes a portion closer to the center of the vehicle, that has a lower part being bent in the forward direction of the vehicle and having a tip end portion welded to an end portion of the seat back inner 10. An upper portion of the seat back inner 10 is bent in a rearward direction of the vehicle, and a tip end portion of the upper portion is welded to the weld flange 8c of the rear deck member extension 8.

Figure 3:
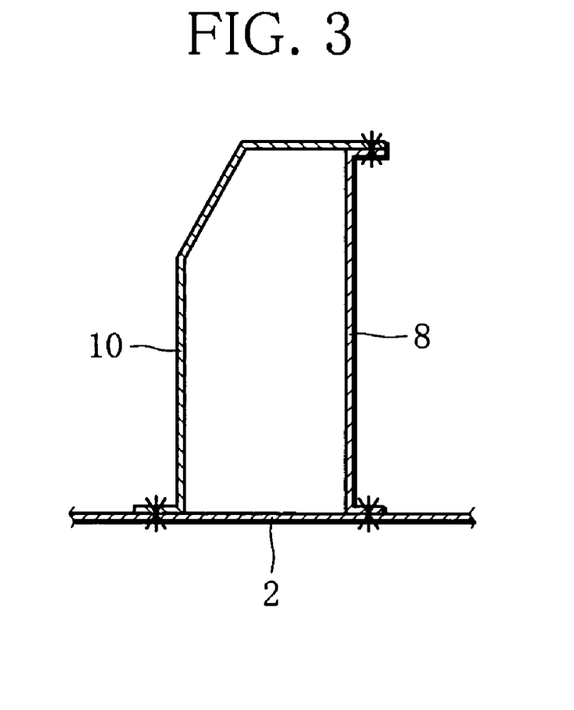
FIG. 3 is a cross section taken along line A—A of FIG. 1.

Accordingly, as illustrated in FIG. 3 showing a cross section taken along line A—A of FIG. 1, a closed cross sectional structure is formed by the wheelhouse inner 2, the rear deck member extension 8 and the seat back inner 10.

Figure 4:
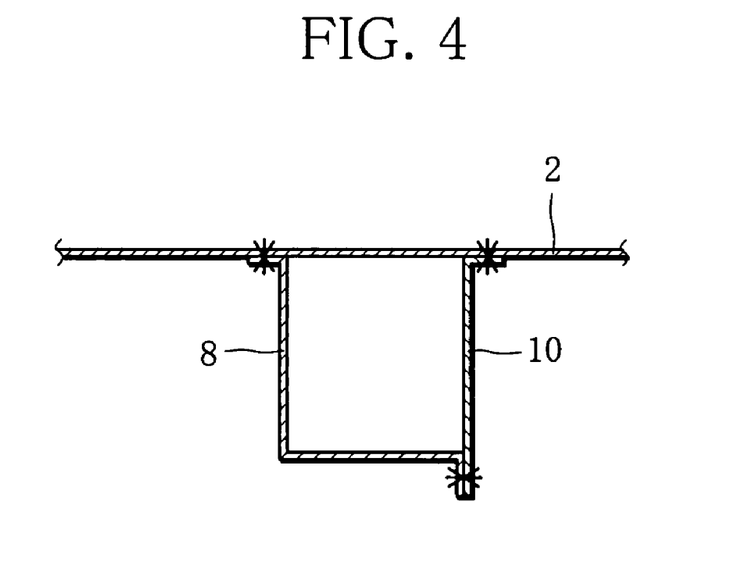
FIG. 4 is a cross section taken along line B—B of FIG. 1.

A lower end portion of the rear deck member extension 8 and that of the seat back inner 10 are welded to an upper end portion of the strut support bracket 12. Thus, as illustrated in FIG. 4 showing a cross section taken along line B—B of FIG. 1, the closed cross sectional structure is formed by the wheelhouse inner 2, the rear deck member extension 8 and the seat back inner 10 so as to continue from the strut support bracket 12.

The rear pillar inner 1 and the wheelhouse inner 2 are welded to each other at a weld flange 2a of the wheelhouse inner 2, and the wheelhouse inner 2 has a lower end portion being welded to a weld flange 18a of a floor panel 18.

The rear deck member extension 8 and the seat back inner 10 are welded to the rear pillar inner 1 at weld flanges 8b and 10b.

In other words, the rear pillar inner 1 is coupled to the top of the strut base 4 with sufficient rigidity and strength portion through the closed cross sectional structure formed by the rear deck member extension 8, the seat back inner 10 and the wheelhouse inner 2, and through that formed by the strut support bracket 12 and the wheelhouse inner 2.

Consequently, when the vehicle body is applied with an input load from a rear wheel through the rear strut, the input load is transmitted to the rear pillar inner 1 through the strut support bracket 12, the rear deck member extension 8 and the seat back inner 10. Since the rear deck member extension 8, the seat back inner 10, the strut support bracket 12 and the wheelhouse inner 2 form the closed cross sectional structures, the input load is satisfactorily transmitted to the rear pillar inner 1 without deforming and damaging the rear deck member extension 8 and the seat back inner 10.

A rear pillar reinforcement 6, in which one of four sides of a cross section thereof is open, is fixed to the rear pillar inner 1 from the outside in the width direction of the vehicle, the rear pillar reinforcement 6 being welded at weld flanges 6a, 6b which are edge portions thereof. Accordingly, a closed cross sectional structure is formed by the rear pillar reinforcement 6 and the rear pillar inner 1, thereby improving rigidity and strength of the rear pillar inner 1.

Figure 5:
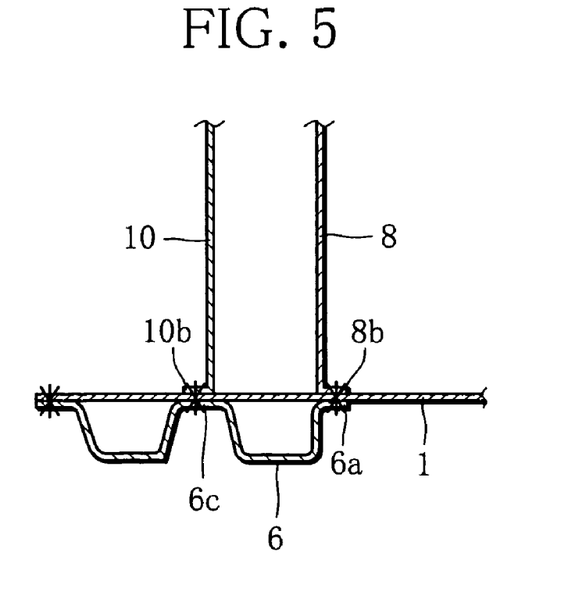
FIG. 5 is a cross section taken along line C—C of FIG. 1.

Specifically, as illustrated in FIG. 5 showing a cross section taken along line C—C of FIG. 1, formed in a central portion of the rear pillar reinforcement 6 is a concave portion 6c contacting the rear pillar inner 1. Thus, the rear pillar reinforcement 6 has two portions in which one of four sides of each cross section is open. The weld flange 8b of the rear deck member extension 8 and the weld flange 6a, which is one edge portion of the open cross section, are located to coincide with each other and welded to each other with the rear pillar inner 1 therebetween. The weld flange 10b of the seat back inner 10 and the concave portion 6c forming the other edge portion are positioned to coincide with each other and welded together with the rear pillar inner 1 therebetween.

In other words, the rear deck member extension 8 is directly welded to the weld flange (edge portion in which one of four sides of the cross section thereof is open) 6a with the rear pillar inner 1 therebetween, and the seat back inner 10 is directly welded to the concave portion (edge portion in which one of four sides of the cross section thereof is open) 6c with the rear pillar inner 1 therebetween. This improves rigidity and strength of the joint between the coupling member and the rear pillar inner 1.

Thus, the input load, which is transmitted from the rear strut to the rear pillar inner 1 through the rear deck member extension 8 and the seat back inner 10, is effectively and reliably received by the rear pillar reinforcement 6 without deforming the rear pillar inner 1 due to the closed cross sectional structure formed by the rear pillar reinforcement 6 and the rear pillar inner 1.

Figure 6:
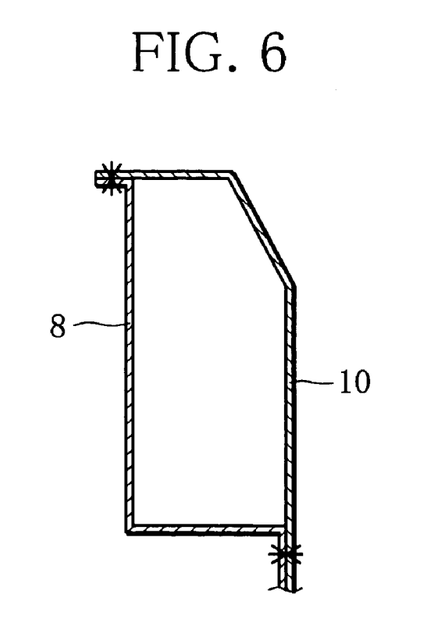
FIG. 6 is a cross section taken along line D—D of FIG. 1.

As illustrated in FIG. 6 showing a cross section taken along line D—D of FIG. 1, the rear deck member extension 8 and the seat back inner 10 form a closed cross sectional structure in a portion closer to the center of the vehicle.

The rear deck member extension 8 is welded to an end portion of a rear deck member 14 stretching from right to left in the width direction of the vehicle, being formed in an L-shape in section, and having a lower portion extending in the forward direction of the vehicle. The seat back inner 10 is welded to an end portion of a rear shelf extension 16 stretching from right to left in the width direction of the vehicle, being formed in an L-shape in section, and having an upper portion extending in the rearward direction of the vehicle. The rear deck member 14 and the rear shelf extension 16 overlap each other, and a weld flange 14a and a weld flange 16a are welded together, whereby the rear deck member 14 and the rear shelf extension 16 form a closed cross sectional structure.

In other words, there is formed a complete closed cross sectional structure (box construction) by the rear pillar inner 1, the wheelhouse inner 2, and the coupling member, namely the rear deck member extension 8, the seat back inner 10, the strut support bracket 12, the rear deck member 14 and the rear shelf extension 16, thereby accomplishing the vehicle body structure having high rigidity and strength around the rear suspension.

Therefore, the vehicle body structure with high rigidity and strength (especially torsion rigidity and torsion strength of the vehicle body) is attained not only between the top of the strut base 4 and the rear pillar inner 1 but also in the width direction of the vehicle, that is, between right and left strut bases 4, 4.

Consequently, even if the vehicle body is applied with the input load from the rear wheels through the rear struts, the input load is satisfactorily transmitted to the other strut base 4 side due to the closed cross sectional structure which is formed by the rear inner 1, the wheelhouse inner 2 and the coupling member, namely the rear deck member extension 8, the seat back inner 10, the strut support bracket 12, the rear deck member 14 and the rear shelf extension 16, whereby the input load is surely received without causing torsion of the vehicle and the like.

As described above, with the vehicle body structure of the periphery of the rear suspension according to the present invention, high rigidity and strength are assured along the width direction of the vehicle and in the periphery of the rear suspension. Therefore, in case that the vehicle body is applied with the input load from the rear wheels through the rear strut, the input load can be surely received by the coupling member without deformation and damaging of the vehicle body components, the torsion of the vehicle body, etc. As a consequence, even a vehicle formed in the monocoque structure is improved in reliability of the body thereof.

Since the closed cross sectional structure is formed with the seat back inner (seat back inner member) 10 that supports a seat back of a vehicle seat as described above and the rear shelf extension (rear shelf member) 16 included in the coupling member, it is possible to improve the rigidity and strength of the vehicle body in the periphery of the rear suspension while using the vehicle body components effectively without adding new components.

In such a structure, the seat back inner 10 may integrally include the rear shelf side 11. This also makes it possible to improve the rigidity and strength of the body in the periphery of the rear suspension while using the components effectively without adding new ones.

Furthermore, assembling the coupling member in the form of the closed cross sectional structure makes the construction relatively simple and facilitates the welding operation.

Next, a second embodiment will be described below.

Figure 7:
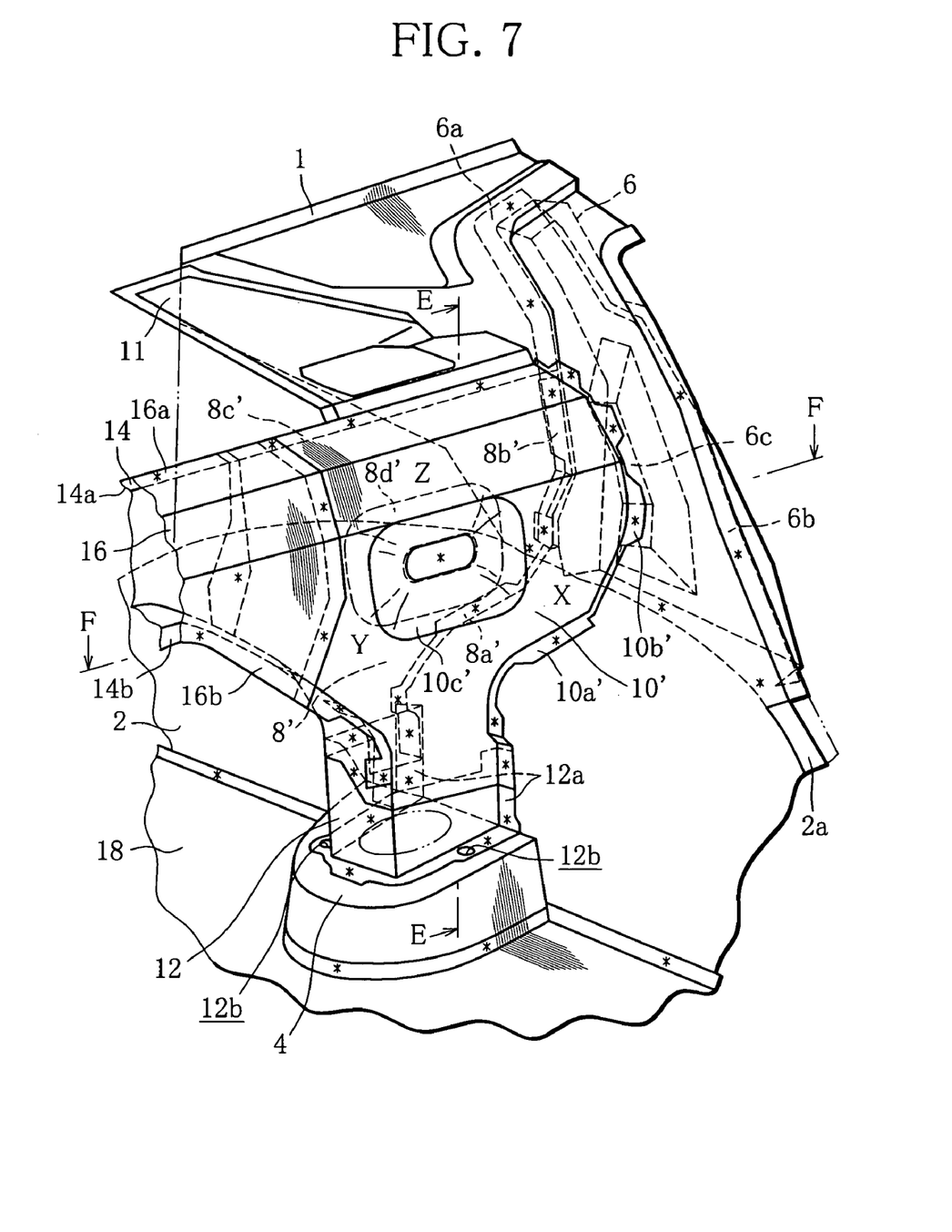
FIG. 7 is a perspective view showing a vehicle body structure of a periphery of a rear suspension according to a second embodiment of the present invention.
Figure 8:
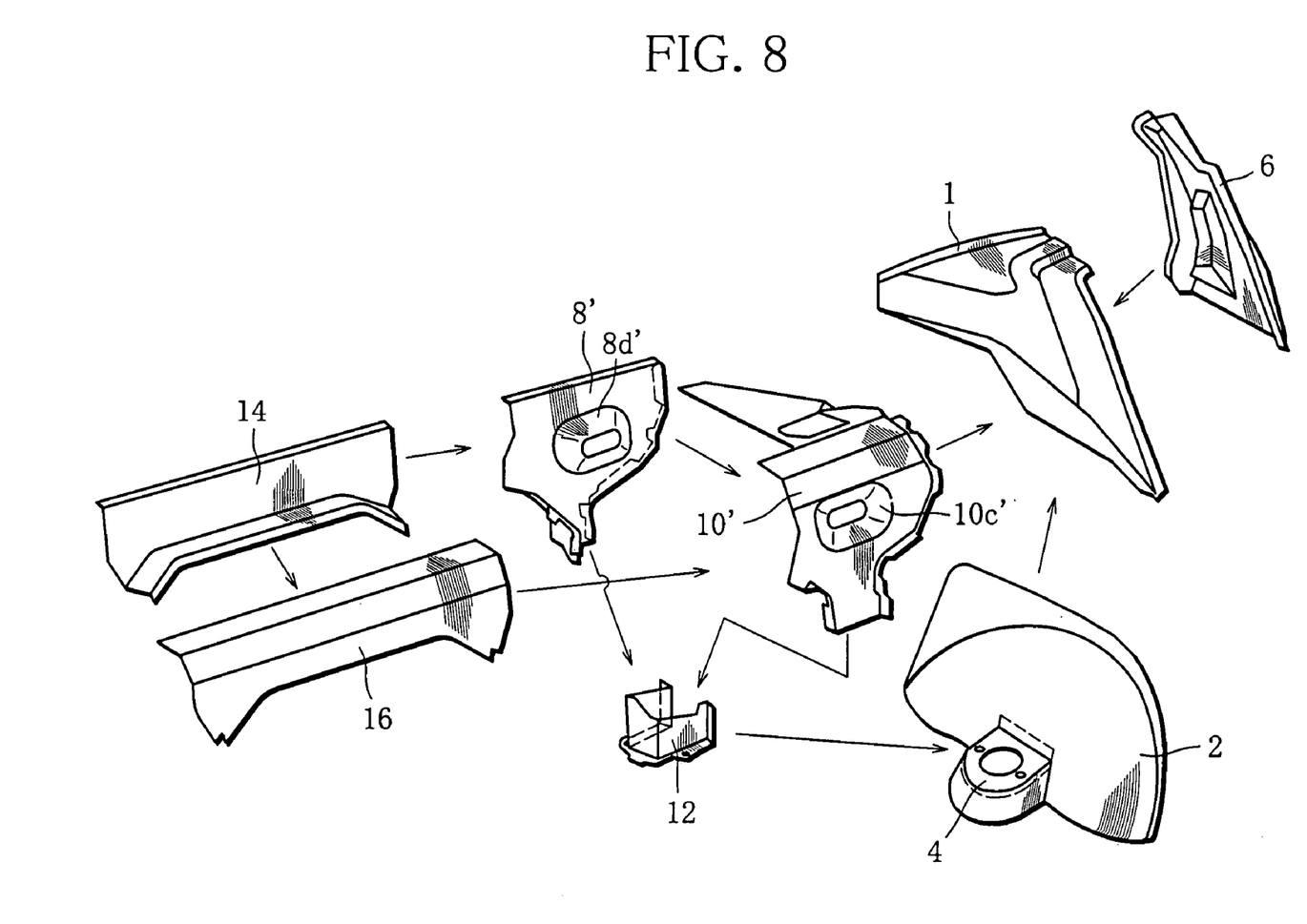
FIG. 8 is a view showing components of the vehicle body structure of the periphery of the rear suspension according to the second embodiment of the present invention.

FIG. 7 is a perspective view of the vehicle body structure of the periphery of the rear suspension according to the second embodiment of the present invention, viewed from the passenger compartment. FIG. 8 shows components used in the vehicle body structure of the periphery of the rear suspension according to the second embodiment of the present invention.

In the second embodiment, the coupling member is made up of steel plate members, such as a rear deck member extension 8', a seat back inner 10', the strut support bracket 12, the rear deck member 14, and the rear shelf extension 16. Herein, components identical to those of the first embodiment will be provided with the same reference numerals. Explanations of the identical components will be omitted, and only differences with the first embodiment will be described.

Formed in a substantially central portion of the rear deck member extension 8' is a concave portion 8$d'$ which is convexly curved in the forward direction of the vehicle. In a substantially central portion of the seat back inner 10', a concave portion 10$c'$ which is convexly curved in the rearward direction of the vehicle is formed correspondingly to the concave portion 8$d'$. The central portions of the concave portions 8$d'$ and 10$c'$ are located close to each other and put together to be welded to each other. In other words, there is formed a bulkhead structure in the substantially central portion of the rear deck member extension 8' and the seat back inner 10' (a pair of plate members) by bringing the central portions of the concave portions 8$d'$ and 10$c'$ to coincide with each other and welding them together.

Figure 9:
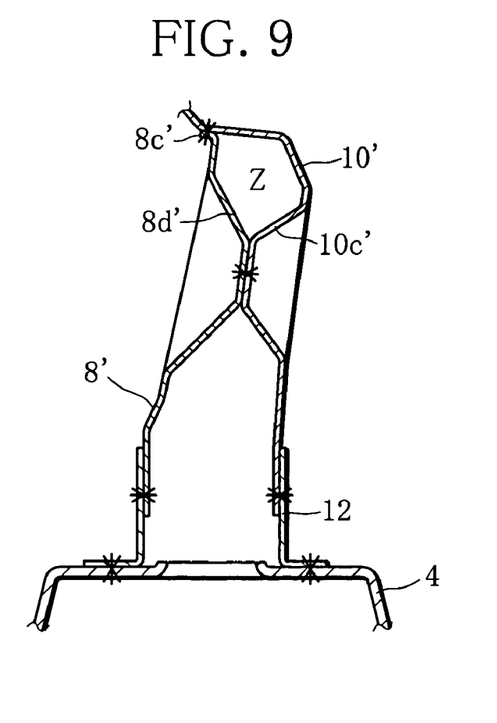
FIG. 9 is a cross section taken along line E—E of FIG. 7.
Figure 10:
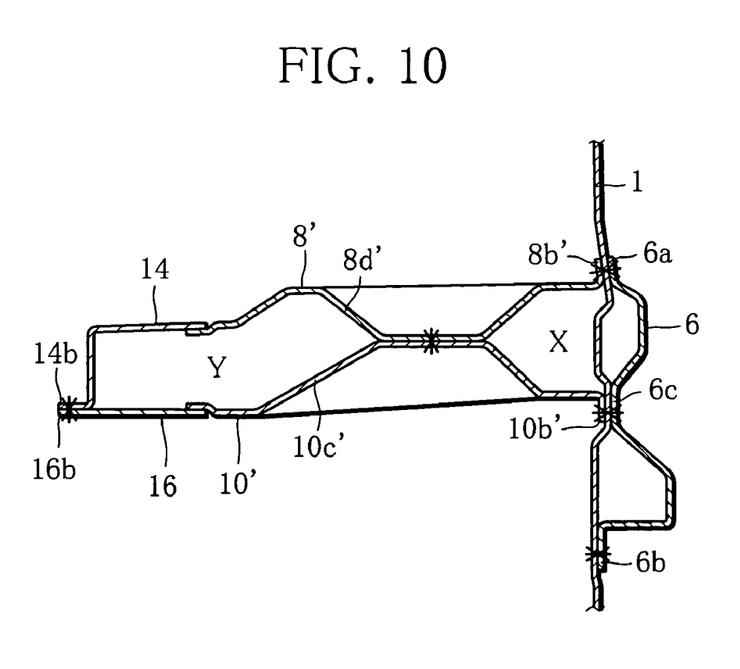
FIG. 10 is a cross section taken along line F—F of FIG. 7.

As illustrated in FIG. 9 showing a cross section of the coupling member taken along line E—E of FIG. 7 in FIG. 10 showing a cross section of the coupling member taken along line F—F of FIG. 7, there is formed a closed cross sectional structure around the bulkhead structure, which is composed of the concave portions 8$d'$ and 10$c'$, so as to surround the bulkhead structure by welding the rear deck member extension 8' and the seat back inner 10' to the rear pillar inner 1 (rear pillar reinforcement 6), the wheelhouse inner 2, the strut support bracket 12, the rear deck member 14 and the rear shelf extension 16, welding the rear deck member 14 to the rear shelf extension 16, and bringing the rear deck member extension 8' to coincide with the seat back inner 10' to be welded together at the concave portions 8$d'$ and 10$c'$.

More specifically, in the second embodiment, there is formed a closed cross sectional structure by the strut support bracket 12, the wheelhouse inner 2, the rear deck member extension 8' and the seat back inner 10' in an area closer to the wheelhouse inner 2 (indicated by an X) than to the bulkhead structure which is composed of the concave portions 8$d'$ and 10$c'$ (first coupling portion). At the same time, there is formed a closed cross sectional structure by the strut support bracket 12, the rear deck member extension 8', the seat back inner 10', the rear deck member 14 and the rear shelf extension 16 in an area closer to the center of the vehicle (indicated by a Y) than to the bulkhead structure (second coupling portion). There is further formed a closed cross sectional structure by the rear deck member extension 8', the seat back inner 10', the rear deck member 14 and the rear shelf extension 16 in an area above the bulkhead structure (indicated by a Z) (third coupling portion).

Specifically, the rear pillar inner 1 is coupled to an upper surface of the strut base 4 with sufficient rigidity and strength through the closed cross sectional structure portion (first coupling portion) comprising the strut support bracket 12, the wheelhouse inner 2, the rear deck member extension 8' and the seat back inner 10'. The upper surfaces of the right and left strut bases 4, 4 are coupled to each other with sufficient rigidity and strength through the closed cross sectional structure portion (second coupling portion) comprising the strut support bracket 12, the rear deck member extension 8', the seat back inner 10', the rear deck member 14 and the rear shelf extension 16. Moreover, the right and left rear pillar inners 1 are coupled to each other with sufficient rigidity and strength through the closed cross sectional structure portion (third coupling portion) comprising the rear deck member extension 8', the seat back inner 10', the rear deck member 14 and the rear shelf extension 16.

In case that the couplement is carried out between the upper surface of the strut base 4 and the rear pillar inner 1, between the upper surfaces of the right and left strut bases 4, 4, and between the right and left rear pillar inners 1, 1 through the respective closed cross sectional structure portions which is formed around the bulkhead structure, the input load transmitted from the rear wheels to the strut bases 4, 4 through the rear suspension is satisfactorily dispersed and transmitted to the closed cross sectional structure portion (first coupling portion) that couples the upper surface of the strut base 4 to the rear pillar inner 1 and the closed cross sectional structure portion (second coupling portion) that couples the upper surfaces of the strut bases 4, 4 together, avoiding the bulkhead structure portion.

As a consequence, in spite of the simple structure in which the concave portions 8d' and 10c' are positioned to coincide with each other to be welded together, it is possible to efficiently disperse and transmit the input load from the rear suspension to the rear pillar inner 1 side and the other strut base 4 side. It is also possible to dramatically improve the rigidity and strength of the vehicle body in the periphery of the rear suspension while assuring the rigidity and strength acting in the width direction of the vehicle by way of the closed cross sectional structure portion (third coupling portion) that couples the right and left rear pillar inners 1, 1.

This further improves reliability of the body even in a vehicle formed in the monocoque structure.

Next, a third embodiment will be described below.

Figure 11:
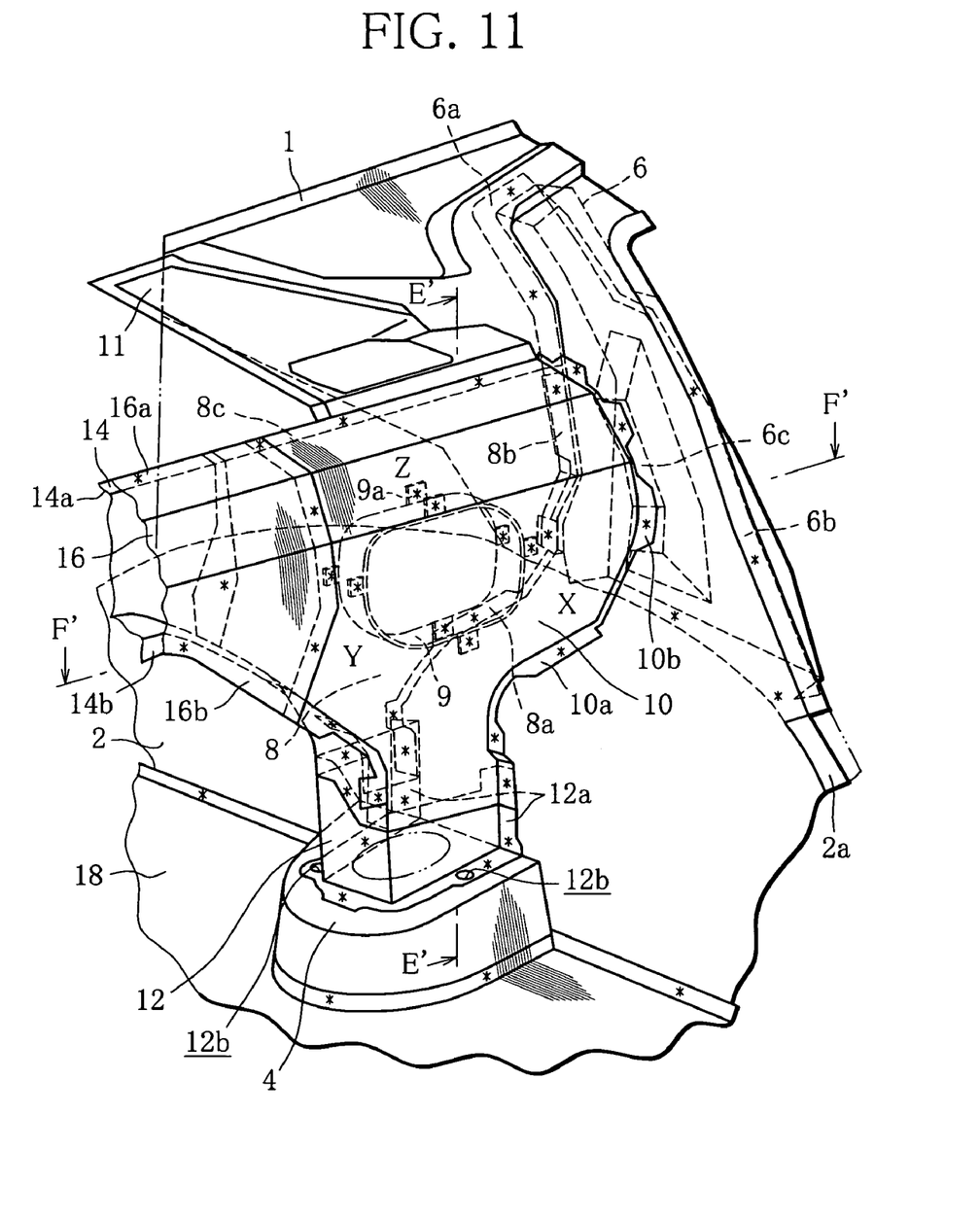
FIG. 11 is a perspective view showing a vehicle body structure of a periphery of a rear suspension according to a third embodiment of the present invention.
Figure 12:
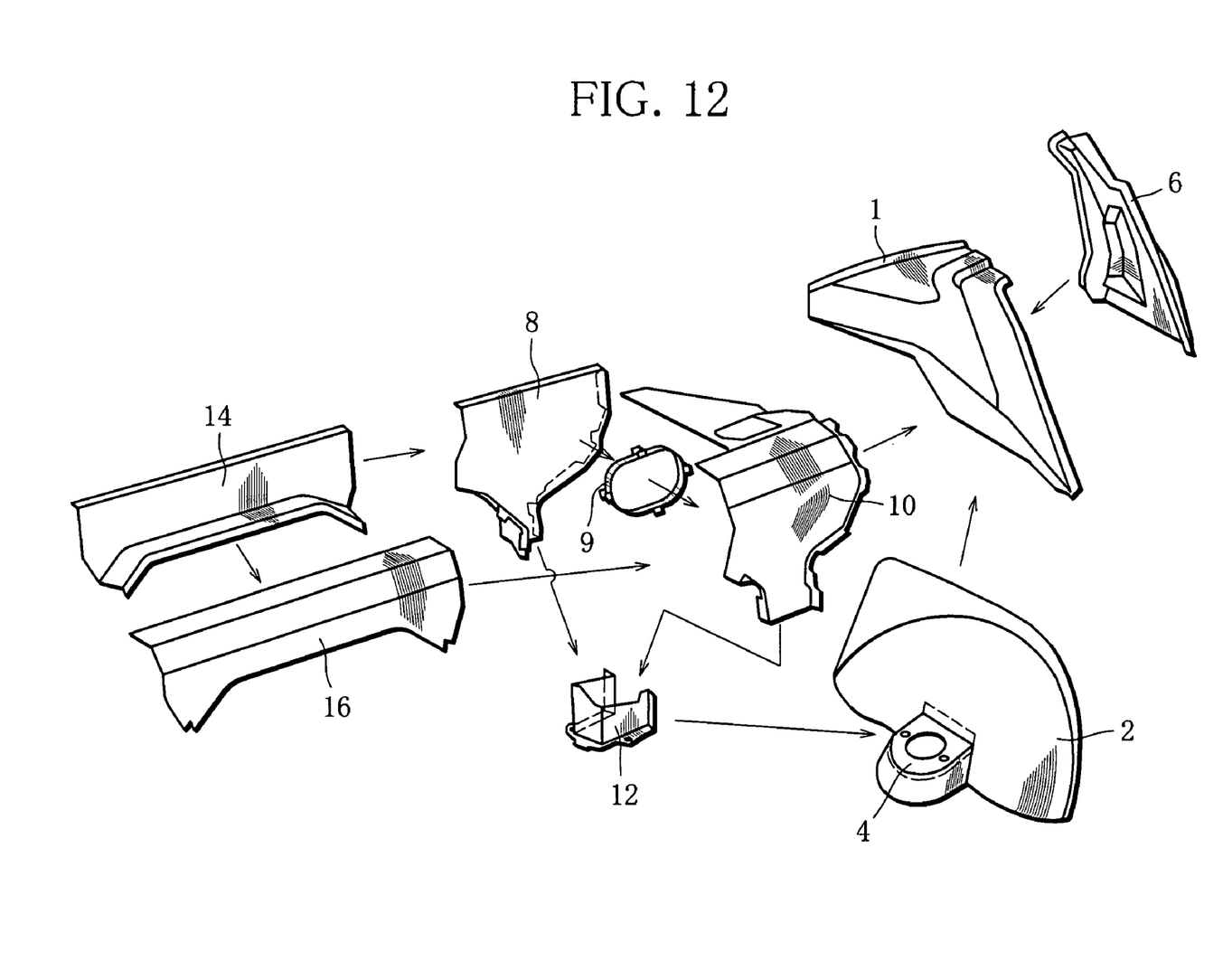
FIG. 12 is a view showing components of the vehicle body structure of the periphery of the rear suspension according to the third embodiment of the present invention.

FIG. 11 is a perspective view of the vehicle body structure of the periphery of the rear suspension according to the third embodiment of the present invention, viewed from the passenger compartment. FIG. 12 shows components used in the vehicle body structure of the periphery of the rear suspension according to the third embodiment of the present invention.

Although the third embodiment has the bulkhead structure like the second embodiment, the bulkhead structure portion is different from that of the second embodiment. Components identical to those of the first and second embodiments will be provided with the same reference numerals. Explanations of the identical components will be omitted, and only differences with the first and second embodiments will be described.

A bulkhead member 9 formed into an endless band is interposed between a substantially central portion of the rear deck member extension 8 and that of the seat back inner 10 so as to partition off the substantially central portions. Specifically, for example, a plurality of weld flanges 9a are each welded to the rear deck member extension 8 and the seat back inner 10. The bulkhead member 9 may be formed into any shape as long as it is endless, and for example, may have an inverted triangle shape corresponding to the shape of the rear deck member extension 8 and seat back inner 10 instead of the cylindrical shape.

That is, in the third embodiment, a bulkhead structure is formed by interposing the endless bulkhead member 9 between the substantially central portions of the rear deck member extension 8 and the seat back inner 10 (a pair of plate members).

Figure 13:
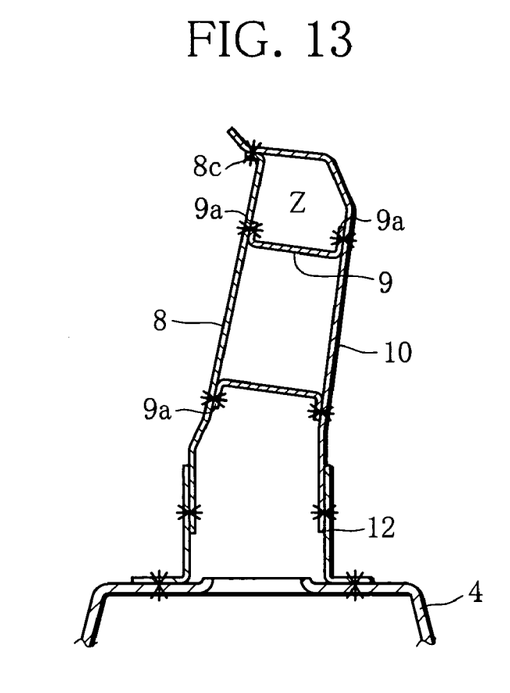
FIG. 13 is a cross section taken along line E'—E' of FIG. 11.
Figure 14:
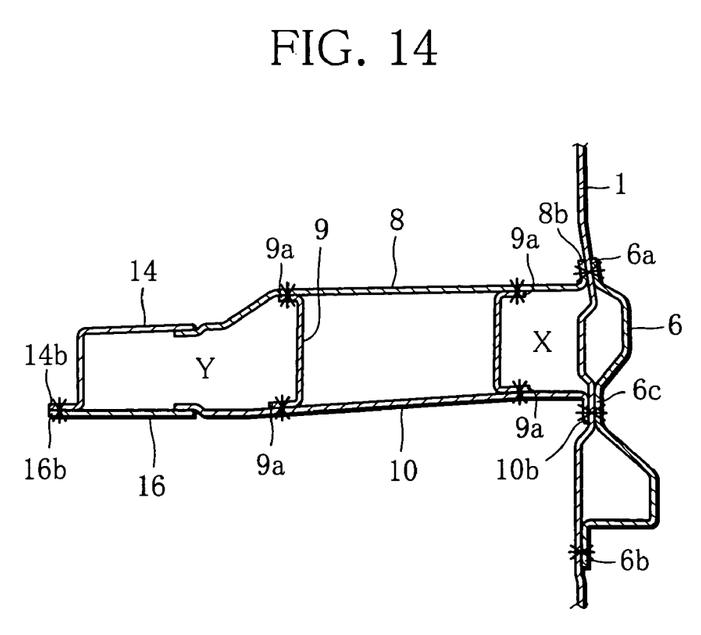
FIG. 14 is a cross section taken along line F'—F' of FIG. 11.

As illustrated in FIG. 13 showing a cross section taken along line E'—E' of FIG. 11 and in FIG. 14 showing a cross section taken along line F'—F' of FIG. 11, there is formed a closed cross sectional structure around the bulkhead member 9 so as to surround the bulkhead member 9 by welding the rear deck member extension 8 and the seat back inner 10 to the wheelhouse inner 2, the strut support bracket 12 and the rear pillar inner 1, and interposing the bulkhead member 9 between the rear deck member extension 8 and the seat back inner 10.

More specifically, with the coupling member according to the third embodiment, there is formed a closed cross sectional structure by the strut support bracket 12, the wheelhouse inner 2, the rear deck member extension 8, the seat back inner 10 and the bulkhead member 9 in an area closer to the wheelhouse inner 2 (indicated by an X) than to the bulkhead member 9 (first coupling portion). There is also formed a closed cross sectional structure by the strut support bracket 12, the rear deck member extension 8, the seat back inner 10, the bulkhead member 9, the rear deck member 14 and the rear shelf extension 16 in an area closer to the center of the vehicle (indicated by a Y) than to the bulkhead member 9 (second coupling portion). Moreover, there is formed a closed cross sectional structure by the rear deck member extension 8, the seat back inner 10, the bulkhead member 9, the rear deck member 14 and the rear shelf extension 16 in an area above the bulkhead member 9 (indicated by a Z) (third coupling portion).

In other words, the rear pillar inner 1 is coupled to the upper surface of the strut base 4 with sufficient rigidity and strength through the closed cross sectional structure portion (first coupling portion) comprising the strut support bracket 12, the wheelhouse inner 2, the rear deck member extension 8, the seat back inner 10 and the bulkhead member 9. At the same time, the upper surfaces of the right and left strut bases 4, 4 are coupled together with sufficient rigidity and strength through the closed cross sectional structure portion (second coupling portion) comprising the strut support bracket 12, the rear deck member extension 8, the seat back inner 10, the bulkhead member 9, the rear deck member 14 and the rear shelf extension 16. Furthermore, the right and left rear pillar inners 1, 1 are coupled to each other with sufficient rigidity and strength through the closed cross sectional structure portion (third coupling portion) comprising the rear deck member extension 8, the seat back inner 10, the bulkhead member 9, the rear deck member 14 and the rear shelf extension 16.

Consequently, also in the case of the third embodiment, the input load, which is transmitted from the rear wheels to the strut bases 4, 4 through the rear suspension, is satisfactorily dispersed and transmitted to the closed cross sectional structure portion (first coupling portion) that couples the rear pillar inner 1 to the upper surface of the strut base 4 and the closed cross sectional structure portion (second coupling portion) that couples the upper surfaces of the strut bases 4, 4 together, avoiding the bulkhead structure portion, as in the second embodiment.

As a result, in spite of the simple structure in which the bulkhead member 9 is interposed between the rear deck member extension 8 and the seat back inner 10, it is possible to efficiently disperse and transmit the input load from the rear suspension to the rear pillar inner 1 side and the other strut base 4 side. It is also possible to dramatically improve the rigidity and strength of the vehicle body in the periphery of the rear suspension while assuring the rigidity and strength acting in the width direction of the vehicle due to the closed cross sectional structure portion (third coupling portion) that couples the right and left rear pillar inners 1, 1 together.

This enables further improvement in reliability of a vehicle body formed in the monocoque structure.

What is claimed is:

1. A vehicle body structure of a periphery of a rear suspension, including a rear suspension base member, which receives an input load from the rear suspension, in a wheelhouse inner member and being formed by joining said wheelhouse inner member to a rear quarter inner member, said vehicle body structure comprising:
   a coupling member for coupling said rear quarter inner member to an upper surface of said rear suspension base member for reinforcement,
   wherein said coupling member comprises plate members and forms a closed cross sectional structure in consort with said wheelhouse inner member and said rear quarter inner member, and
   wherein said coupling member includes a seat back inner member that is joined to said wheelhouse inner member to support a seat back of a vehicle seat, and forms the closed cross sectional structure using part of the seat back inner member.

2. The vehicle body structure according to claim 1,
   a wherein the coupling member extends in a width direction of the vehicle to couple upper surfaces of right and left rear suspension base members together, which are located on the right and the left in pairs, and couple right and left rear quarter inner members together, which are located on the right and the left in pairs.

3. The vehicle body structure according to claim 1, wherein said coupling member further includes a rear shelf member and forms the closed cross sectional structure using part of said rear shelf member.

4. The vehicle body structure
   a according to claim 2, wherein the coupling member includes a first coupling portion that couples upper surfaces of said rear suspension base members to said rear quarter inner members, a second coupling portion that couples upper surfaces of said rear suspension base members together and a third coupling portion that joins said second coupling portion to couple said rear quarter inner members together, the coupling member being integrally formed, and wherein said coupling member has a bulkhead structure in a portion surrounded by said first, second and third coupling portions.

5. The vehicle body structure according to claim 4, wherein said bulkhead structure has a pair of plate members positioned close to each other, the plate members facing each other in the portion surrounded by said first, second and third coupling portions being joined together.

6. The vehicle body structure according to claim 4, wherein said bulkhead structure has an endless bulkhead member interposed between a pair of plate members so as to partition off said portion, the plate members facing each other in the portion surrounded by said first, second and third coupling portions.

7. A vehicle body structure of a periphery of a rear suspension, including a rear suspension base member, which receives an input load from the rear suspension, in a wheelhouse inner member and being formed by joining said wheelhouse inner member to a rear quarter inner member, said vehicle body structure comprising:
   a coupling member for coupling said rear quarter inner member to an upper surface of said rear suspension base member for reinforcement; and
   a reinforcing member having an open cross section along one of four sides thereof, the reinforcing member extending in a substantial vertical direction of the vehicle body and being joined to said rear quarter inner member,
   wherein said coupling member comprises plate members and forms a closed cross sectional structure in consort with said wheelhouse inner member and said rear quarter inner member, and
   wherein said coupling member has flanges extending substantially in the vertical direction of the vehicle body and is coupled to said rear quarter inner member so that at least the flanges extending in the vertical direction of the vehicle body coincide with edge portions of said reinforcing member along the one side of the open cross section.

8. The vehicle body structure according to claim 7, wherein the coupling member extends in a width direction of the vehicle to couple upper surfaces of right and left rear suspension base members together, which are located on the right and the left in pairs, and couple right and left rear quarter inner members together, which are located on the right and the left in pairs.

9. The vehicle body structure according to claim 8, wherein said coupling member includes a seat back inner member that is joined to said wheelhouse inner member to support a seat back of a vehicle seat and forms the closed cross sectional structure using part of said seat back inner member.

* * * * *